US009553661B2

(12) United States Patent
Meng et al.

(10) Patent No.: US 9,553,661 B2
(45) Date of Patent: Jan. 24, 2017

(54) ADAPTIVE PRECONFIGURATION IN OPTICAL TRANSPORT NETWORK

(71) Applicant: Ciena Corporation, Hanover, MD (US)

(72) Inventors: Hongxing Meng, Cumming, GA (US); Abhishek Chaudhary, Cumming, GA (US); Saravanan Purushothaman, Cumming, GA (US); David McDonald, Atlanta, GA (US); Veena Alevoor, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 23 days.

(21) Appl. No.: 14/714,438

(22) Filed: May 18, 2015

(65) Prior Publication Data

US 2016/0344471 A1    Nov. 24, 2016

(51) Int. Cl.
*H04B 10/032*    (2013.01)
*H04B 10/27*    (2013.01)

(52) U.S. Cl.
CPC ............ *H04B 10/032* (2013.01); *H04B 10/27* (2013.01)

(58) Field of Classification Search
CPC .............................. H04B 10/032; H04B 10/27
USPC .............................................................. 398/2
See application file for complete search history.

(56) References Cited

U.S. PATENT DOCUMENTS

| 7,957,421 | B2 | 6/2011 | Wang |
| 8,045,551 | B2 | 10/2011 | Madrahalli et al. |
| 8,259,733 | B2 | 9/2012 | Conklin et al. |
| 8,417,111 | B2 | 4/2013 | Moynihan et al. |
| 8,559,812 | B2 | 10/2013 | Oltman et al. |
| 8,665,889 | B2 | 3/2014 | Gopalakrishna et al. |
| 8,682,158 | B2 | 3/2014 | Smith et al. |
| 8,699,346 | B2 | 4/2014 | Madrahalli et al. |
| 8,817,824 | B2 | 8/2014 | Connolly et al. |
| 8,929,735 | B2 | 1/2015 | Madrahalli et al. |
| 8,953,948 | B2 | 2/2015 | Meng et al. |
| 2011/0274427 | A1* | 11/2011 | Madrahalli ........... H04J 3/1652 398/58 |
| 2013/0114953 | A1* | 5/2013 | Moynihan ............ H04B 10/032 398/5 |
| 2013/0266312 | A1* | 10/2013 | Prakash ................. H04B 10/07 398/33 |
| 2013/0315592 | A1* | 11/2013 | Sharma .................. H04B 10/27 398/58 |

(Continued)

OTHER PUBLICATIONS

"Interfaces for the optical transport network," International Telecommunication Union (ITU-T), Feb. 2012, pp. 1-238.

(Continued)

*Primary Examiner* — Dalzid Singh
(74) *Attorney, Agent, or Firm* — Clements Bernard PLLC; Christopher L. Bernard; Lawrence A. Baratta, Jr.

(57) ABSTRACT

A network element operating in an Optical Transport Network (OTN) network and configured to adaptively preconfigure OTN connections includes one or more ports, each port including hardware supporting an Optical channel Transport Unit level k (OTUk) configured to transport an Optical channel Data Unit level k (ODUk) or one or more Optical channel Data Unit level j's (ODUj's), j<k; wherein, when a port of the one or more ports is installed with an idle connection, the port is automatically preconfigured in either a connection mode for the ODUk or a trail termination mode for the one or more ODUj's based on existing OTN connections in the OTN network.

19 Claims, 11 Drawing Sheets

(56) References Cited

U.S. PATENT DOCUMENTS

| | | |
|---|---|---|
| 2013/0322867 A1 | 12/2013 | Ibach et al. |
| 2014/0169783 A1 | 6/2014 | Surek |
| 2014/0186019 A1 | 7/2014 | Chaudhary et al. |
| 2014/0193146 A1* | 7/2014 | Lanzone .................. H04J 3/14 398/2 |
| 2014/0314402 A1 | 10/2014 | Moynihan et al. |
| 2015/0256465 A1* | 9/2015 | Mack-Crane .......... H04L 41/12 709/232 |

OTHER PUBLICATIONS

"Characteristics of optical transport network hierarchy equipment functional blocks," International Telecommunication Union (ITU-T), Dec. 2012, pp. 1-390.

* cited by examiner

ADAPTIVE PRECONFIGURATION IN OPTICAL TRANSPORT NETWORK

FIELD OF THE DISCLOSURE

The present disclosure generally relates to networking systems and methods. More particularly, the present disclosure relates to adaptive preconfiguration in Optical Transport Network (OTN) to optimize switch times.

BACKGROUND OF THE DISCLOSURE

Optical Transport Network (OTN) is defined inter alia in ITU-T recommendation G.709 "Interfaces for the optical transport network" (February 2012) and G.798 "Characteristics of optical transport network hierarchy equipment functional blocks" (December 2012), the contents of which are incorporated by reference. Various protection schemes are often employed to protect customer traffic including line protection (e.g., Automatic Protection Switching (APS)) and/or mesh protection (e.g., through a control plane) to meet the service level agreements (SLAs). Additionally, network operators want to be able to provide on-demand flexible services to support emerging cloud applications. All this requires that OTN traffic at various Optical channel Data Unit level k (ODUk) rates, with k=0, 1, 2, 3, 4, flex, C2, Cn, etc., be dynamically provisioned or de-provisioned, preferably in real-time for most cases. In the case of protection schemes that use shared bandwidth resources, for example, APS M:N (N is number of work lines and M shared protection lines) or mesh-restorable Subnetwork Connections (SNCs) or Label Switched Paths (LSPs), the dynamic provisioning and de-provisioning has to be fast enough to satisfy the sub 50 ms switching time requirements.

The real-time provisioning of ODUk/j connections is a time-consuming operation that can involve multiple steps before end-to-end service is set up or restored from a previous failure. Some of the issues that could slow down provisioning are as follows. First, Optical channel Transport Unit level k (OTUk) signals can experience glitch due to a reference clock change when the underlying ODUk layer transitions from a connection (pass-through) mode to a trail-terminating mode (or vice-versa). This glitch, when seen at the other end might trigger another protection switch resulting in multiple provisioning events. Second, in situations where new provisioning does not match the current provisioning in hardware. For example, if a new request is to provision an ODUj client rate on an interface that was previously prepared for ODUk (where j<k) signals. Now the provisioning will have to, in real time, first delete the ODUk connection provisioning from hardware and then set it up for a trail termination provisioning. The ODUk can be a High Order (HO) connection whereas the ODUj can be a Low Order (LO) connection.

The real-time provisioning can be sped up if a target line is already preconfigured correctly; thereby obviating the need to do certain time-consuming steps like mode change and eliminating all unnecessary side effects like OTN signal glitch. Thus, it would be advantageous to implement adaptive preconfiguration in OTN networks.

BRIEF SUMMARY OF THE DISCLOSURE

In an exemplary embodiment, a network element is described operating in an Optical Transport Network (OTN) network and configured to adaptively preconfigure OTN connections. The network element includes one or more ports, each port including hardware supporting an Optical channel Transport Unit level k (OTUk) configured to transport an Optical channel Data Unit level k (ODUk) or one or more Optical channel Data Unit level j's (ODUj's), j<k; wherein, when a port of the one or more ports is installed with an idle connection, the port is automatically preconfigured in either a connection mode for the ODUk or a trail termination mode for the one or more ODUj's based on existing OTN connections in the OTN network. The connection mode is configured to support High Order Optical channel Data Unit level k (ODUk) connections and the trail termination mode is configured to support Low Order Optical channel Data Unit level j (ODUj) connections. The network element can be configured to reroute for protection one of the existing OTN connections to a port of the one or more ports with a same mode, avoiding hardware provisioning at run time. The network element can be configured to automatically preconfigure the port based on an evaluation of which of the existing OTN connections restore to the port. The automatic preconfiguration can be configured to distribute modes of the one or more ports, each with an idle connection, to match the existing OTN connections from a protection perspective. The network element can further include a controller communicatively coupled to the one or more ports, wherein the controller is configured to perform the automatic preconfiguration of the port. The automatic preconfiguration of the port can be performed by one of a Software Defined Networking (SDN) controller, a Network Management System (NMS), and an Element Management System (EMS). The network element can be configured to signal to another network element to coordinate a mode of the port via a control plane. The port can be automatically preconfigured based on a determination of potential connections of the existing OTN connections that may reroute to the port for protection. Responsive to the potential connections including one connection, the mode is set for the port to a same mode as the one connection, responsive to the potential connections including multiple connections each with a same mode, the mode is set for the port to the same mode as the multiple connections, and responsive to the potential connections including multiple connections each with different modes, the mode is set for the port based on a distinguishing criteria.

In another exemplary embodiment, a controller is communicatively coupled to one or more nodes in an Optical Transport Network (OTN) network and configured to adaptively preconfigure OTN connections in the OTN network. The controller includes a processor; and memory storing instructions that, when executed, cause the processor to for each idle OTN line in the OTN network, identify potential connections that may reroute to the idle OTN line for protection, and set a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's. The potential connections can be rerouted for protection to an idle OTN line with a same mode, avoiding hardware provisioning at run time. The controller can be configured to distribute modes to match the existing OTN connections in the OTN network from a protection perspective. The memory storing instructions that, when executed, can further cause the processor to, responsive to the potential connections including one connection, set the mode for an idle OTN line to a same mode as the one connection, responsive to the potential connections including multiple connections each with a same mode, set the mode for an idle OTN line to the same mode as the multiple connections, and, responsive to the potential connections including multiple connections each with different modes, set the mode for an idle OTN line based on a distinguishing criteria. The controller can be configured to signal to coordinate a mode of the port via a control plane.

In a further exemplary embodiment, a method is described for adaptively preconfiguring Optical Transport Network (OTN) connections in an OTN network. The method includes, for each idle OTN line in the OTN network, identifying potential connections that may reroute to the idle OTN line for protection; and setting a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's. The method can further include, responsive a fault, rerouting one of the potential connections for protection to an idle OTN line with a same mode, avoiding hardware provisioning at run time. The method can further include periodically cycling through all idle OTN lines in the OTN network to rebalance the mode for each to match network dynamics. The method can further include, responsive to the potential connections including one connection, setting the mode for an idle OTN line to a same mode as the one connection, responsive to the potential connections comprising multiple connections each with a same mode, setting the mode for an idle OTN line to the same mode as the multiple connections, and, responsive to the potential connections comprising multiple connections each with different modes, setting the mode for an idle OTN line based on a distinguishing criteria. The distinguishing criteria can be based on a priority of the potential connections.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, adaptive preconfiguration in OTN is described to optimize switch times. The adaptive preconfiguration configures idle lines in advance in a manner that facilitates the optimal distribution of available links in order to minimize or eliminate ODUk mode transitions. At the network plan time, network resources are evaluated based on the available OTN links and bandwidth and the protection schemes supported. As the network dynamics change over time, due to either user intervention (add/remove/modify connections) or protection switching, the adaptive preconfiguration intelligently designates each of the available protection links to either trail termination mode or connection mode. The trail termination mode is for an ODUj LO connection, and the connection mode is for an ODUk HO connection. The designated mode is then automatically preconfigured in a hardware device whenever the link is first initialized, or the previously configured corresponding ODUk layer is de-provisioned. It is expected that the designated mode of an OTN link is the correct mode if traffic is switched to that link, and thus no ODU mode change would be needed at the time of traffic provisioning (or switching). If the mode is not correct, then there would be a mode change, potentially adding time to the switch.

The objective of the adaptive preconfiguration is to intelligently distribute the hardware configuration of OTN links to avoid hardware provisioning updates at a run time. Specifically, the adaptive preconfiguration improves switch time performance by minimizing the number of provisioning steps required in real time. It also avoids OTN frame slips by minimizing or eliminating OTN mode changes. This eliminates double switches since a remote end will not see OTUk defects due to frame slips at the far end.

For example, on an OTU3 line card, a typical provisioning step that creates an ODU3 Trail Termination Point (TTP) and sets up the 32 ODUj Tributary Slots (TS) requires about 10 ms. This 10 ms could be saved in real time if the line on the OTU3 line card is already set up this way. When a request to create an ODUj Connection Termination Point (CTP) comes, there is no need to create the ODU3 TTP and no need to set up the tributaries. The only thing that is done in real time is setting up the tributary slots that the CTP use. As the OTU line rate increases, there are more tributary ports to manage (e.g., 80 on an OTU4 line, etc.), the time savings increase too.

Exemplary Network

Figure 1:
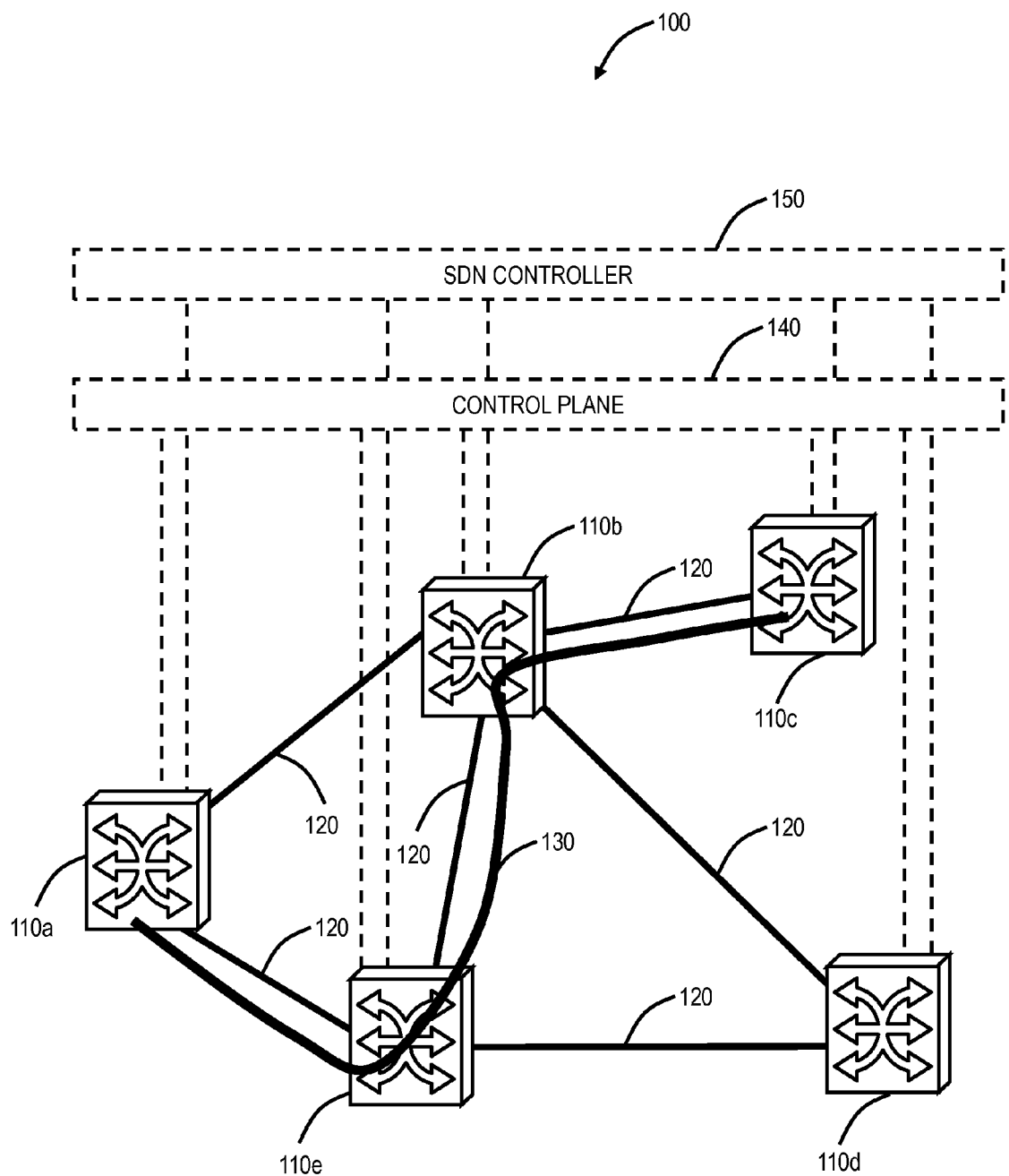
FIG. 1 is a network diagram of an exemplary OTN network with five interconnected nodes.
Figure 2:
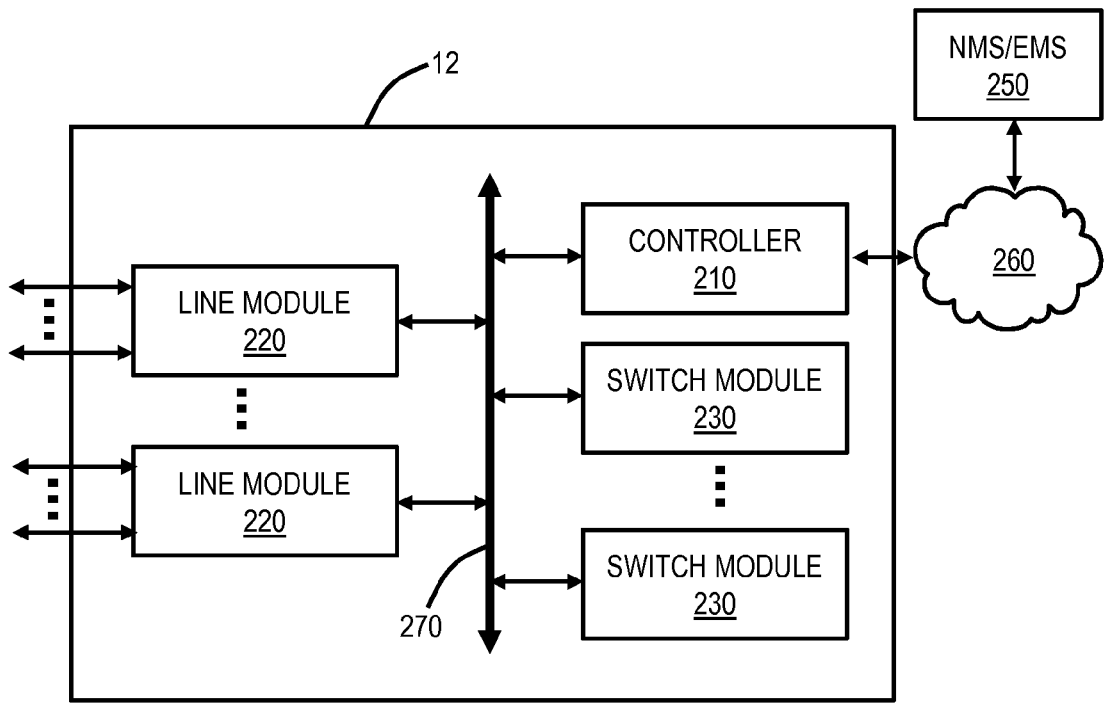
FIG. 2 is a block diagram of an exemplary node in the network of FIG. 1 for the adaptive preconfiguration.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120 which are OTN links. Specifically, each of the links 120 is an OTUk with ODUk or ODUj connections included. The nodes 110 can be network elements which include a plurality of ingress and egress ports forming the links 120. An exemplary network element 110A is illustrated in FIG. 2. The network 100 includes a connection 130 with ingress/egress at the nodes 110a, 110c and intermediate nodes 110b, 110e. The connection 130 can be a Sub-Network Connection (SNC), a Label Switched Path (LSP), or the like. The connection 130 is an end-to-end signaled path and from the view of the client signal contained therein, it is seen as a single network segment. Of course, the network 100 can include a plurality of connections. The nodes 110 can also be referred to interchangeably as network elements (NEs). The network 100 is illustrated, for example, as an interconnected mesh network, and those of ordinary skill in the art will recognize the network 100 can include other architectures, with additional nodes 110 or with fewer nodes 110, etc.

In the network 100, different reference clocks being are used for an OTUk on the link 120 based on the underlying ODUk, ODUj. When an ODUk is unprovisioned (i.e., an open channel), the associated OTUk signal is transmitted by the OTUk function block using a local clock as reference and an ODU-Open Connection Indication (OCI) maintenance signal is typically encapsulated in the ODUk. When an ODUk is configured in a trail termination mode, the OTUk signal is also transmitted using the local clock as reference and a normal maintenance signal is encapsulated in the ODUk. When an ODUk is configured in a connection mode, the OTUk signal is transmitted using the clock derived from the ODUk signal. If the ODUk configuration changes, the clock reference is changed. This causes OTUk frame slips and often leads to OTUk layer issues such as Incoming Alignment Error (IAE), Out of Frame (OOF), Loss of Frame (LOF), etc. being detected at the other end of a fiber connection. It also causes corruption in the General Communication Channel (GCC) bytes (i.e., GCC0/GCC1/GCC2), Automatic Protection Switching (APS), Protection Communication Channel (PCC), Tandem Connection Monitoring (TCM) bytes, thus causing application data loss or misbehaviors.

In various exemplary embodiments, the adaptive preconfiguration, in most practical cases, prevents the mode transition from occurring by preconfiguring a default ODUk mode for each link 120 in the network. The adaptive preconfiguration can be explicitly controlled by the network operator, the SDN controller 150, the control plane 140, or automatically evaluated by protection applications at run time, thus optimizing the switching performance of protected OTN.

The network 100 can include a control plane 140 operating on and/or between the nodes 110a, 110b, 110c, 110d, 110e. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, MPLS, Open Shortest Path First (OSPF), Intermediate System-Intermediate System (IS-IS), or the like. Those of ordinary skill in the art will recognize the network 100 and the control plane 140 can utilize any type of control plane for controlling the nodes 110 and establishing and maintaining connections, such as at and between Layers 0, 1, 2, 3+, etc. Layers 3+ include the network through application layers (Layers 3-7).

An SDN controller 150 can also be communicatively coupled to the network 100 through one or more of the nodes 110. SDN is an emerging framework which includes a centralized control plane decoupled from the data plane. SDN works with the SDN controller 150 knowing a full network topology through configuration or through the use of a controller-based discovery process in the network 100. The SDN controller 150 differs from a management system in that it controls the forwarding behavior of the nodes 110 only, and performs control in real time or near real time, reacting to changes in services requested, network traffic analysis and network changes such as failure and degradation. Also, the SDN controller 150 provides a standard northbound interface to allow applications to access network resource information and policy-limited control over network behavior or treatment of application traffic. The SDN controller 150 sends commands to each of the nodes 110 to control matching of data flows received and actions to be taken, including any manipulation of packet contents and forwarding to specified egress ports. Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

In an exemplary embodiment, the network 100 contemplates the use of the control plane 140. In another exemplary embodiment, the network 100 contemplates the SDN controller 150. In a further exemplary embodiment, the network 100 can include both the control plane 140 and the SDN controller 150. In a further exemplary embodiment, the network 100 can utilize a Network Management System (NMS), Element Management System (EMS), or the like. As is described herein, the adaptive preconfiguration contemplates operation in the network 100 with any control or management plane techniques.

Exemplary Network Element/Node

Referring to FIG. 2, in an exemplary embodiment, a block diagram illustrates an exemplary node 110 in the network 100 for the adaptive preconfiguration. In an exemplary embodiment, the exemplary node 110 can be a network element that may consolidate the functionality of a Packet-Optical Transport System (POTS), Multi-Service Provisioning Platform (MSPP), Digital Cross Connect (DCS), Ethernet and/or Optical Transport Network (OTN) switch, Wave Division Multiplexed (WDM) platform, etc. into a single, high-capacity intelligent switching system providing Layer 0, 1, and/or 2 consolidation. In another exemplary embodiment, the node 110 can be any of an OTN Add/Drop Multiplexer (ADM), Reconfigurable Optical Add/Drop Multiplexer (ROADM), an MSPP, a DCS, a POTS, an optical cross-connect, an optical switch, a router, a switch, a WDM platform, an access/aggregation device, etc. That is, the node 110 can be any digital system with ingress and egress digital signals and switching of channels, timeslots, tributary units, etc. and/or photonic system with ingress and egress wavelengths and switching. While the node 110 is generally shown as an optical network element, the systems and methods contemplated for use with any switching fabric, network element, or network utilizing OTN.

In an exemplary embodiment, the node 110 includes a controller 210, one or more line modules 220, and one or more switch modules 230. The controller 210 can include Operations, Administration, Maintenance, And Provisioning (OAM&P) access; user interface ports; and the like. The controller 210 can connect to a management system 250 through a data communication network 260 (as well as a Path Computation Element (PCE), the SDN controller 150, OpenFlow controller, etc.). The management system 250 can include a network management system (NMS), element management system (EMS), or the like. Additionally, the controller 210 can be configured to operate the control plane as described herein. The node 110 can include an interface 270 for communicatively coupling the controller 210, the line modules 220, and the switch modules 230 together. For example, the interface 270 can be a backplane, mid-plane, a bus, optical or electrical connectors, or the like.

The line modules 220 are configured to provide ingress and egress to the switch modules 230 and to external connections forming the links 120. From a logical perspective, the line modules 220 provide ingress and egress lines to the node 110, and each line module 220 can include one or more physical ports which form the lines. The line modules 220 provide outputs at OTUk rates (k=2, 3, 4, Cn (n=1, 2, 3, . . . ) and can include hardware for provisioning ODUk or ODUj connections in the OTUk. The adaptive preconfiguration focuses on selecting an appropriate hardware configuration for each line on the line modules 220—either a trail termination mode (LO for an ODUj) or a connection mode (HO for an ODUk), based on network dynamics. The switch modules 230 are configured to switch channels, wavelengths, timeslots, tributary units, packets, etc. between the line modules 220.

Those of ordinary skill in the art will recognize the node 110 can include other components which are omitted for illustration purposes, and that the systems and methods described herein is contemplated for use with a plurality of different network elements with the node 110 presented as an exemplary type of a network element. For example, in another exemplary embodiment, the node 110 may not include the switch modules 230, but rather have the corresponding functionality in the line modules 220 (or some equivalent) in a distributed fashion. For the node 110, other architectures providing ingress, egress, and switching between are also contemplated for the systems and methods described herein.

In an exemplary embodiment, a network element operating in an Optical Transport Network (OTN) network and configured to adaptively preconfigure OTN connections includes one or more ports, each port including hardware supporting an Optical channel Transport Unit level k (OTUk) configured to transport an Optical channel Data Unit level k (ODUk) or one or more Optical channel Data Unit level j's (ODUj's), j<k; wherein, when a port of the one or more ports is installed with an idle connection, the port is automatically preconfigured in either a connection mode for the ODUk or a trail termination mode for the one or more ODUj's based on existing OTN connections in the OTN network. The connection mode is configured to support High Order Optical channel Data Unit level k (ODUk) connections and the trail termination mode is configured to support Low Order Optical channel Data Unit level j (ODUj) connections. The network element can be configured to reroute for protection one of the existing OTN connections to a port of the one or more ports with a same mode, avoiding hardware provisioning at run time. The network element can be configured to automatically preconfigure the port based on an evaluation of which of the existing OTN connections restore to the port.

The automatic preconfiguration can be configured to distribute modes of the one or more ports, each with an idle connection, to match the existing OTN connections from a protection perspective. The network element can further include a controller communicatively coupled to the one or more ports, wherein the controller is configured to perform the automatic preconfiguration of the port. The automatic preconfiguration of the port can be performed by one of a Software Defined Networking (SDN) controller, a Network Management System (NMS), and an Element Management System (EMS). The network element can be configured to signal to another network element to coordinate a mode of the port via a control plane. The port can be automatically preconfigured based on a determination of potential connections of the existing OTN connections that may reroute to the port for protection. Responsive to the potential connections including one connection, the mode is set for the port to a same mode as the one connection, responsive to the potential connections including multiple connections each with a same mode, the mode is set for the port to the same mode as the multiple connections, and, responsive to the potential connections including multiple connections each with different modes, the mode is set for the port based on a distinguishing criteria.

Exemplary Controller

Figure 3:
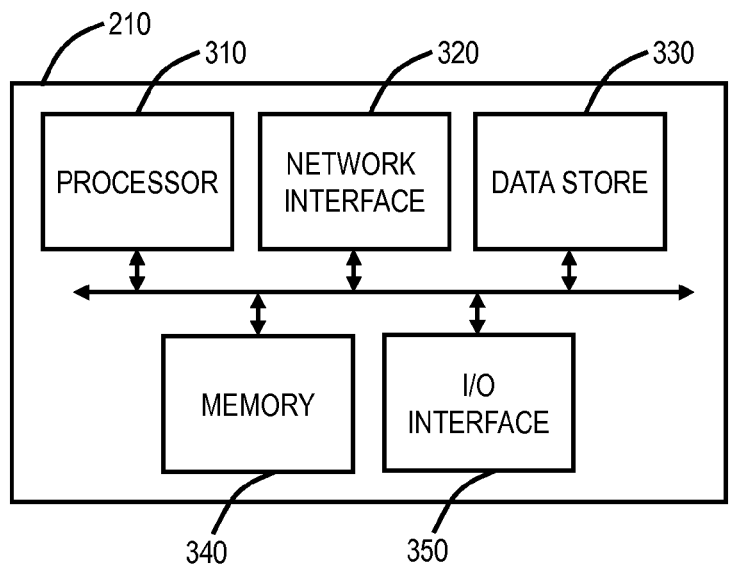
FIG. 3 is a block diagram of a controller from the node of FIG. 2, to provide control plane processing, SDN communication, OAM&P, and data connectivity.

Referring to FIG. 3, in an exemplary embodiment, a block diagram illustrates a controller 210 from the node 110, to provide control plane processing, SDN communication, OAM&P, and data connectivity. The controller 210 can include a processor 310 which is hardware device for executing software instructions, such as operating the control plane 140, communicating with the SDN controller 150, etc. The processor 310 can be any custom made or commercially available processor, a central processing unit (CPU), an auxiliary processor among several processors associated with the controller 210, a semiconductor-based microprocessor (in the form of a microchip or chip set), or generally any device for executing software instructions. When the controller 210 is in operation, the processor 310 is configured to execute software stored within memory, to communicate data to and from the memory, and to generally control operations of the controller 210 pursuant to the software instructions. The controller 210 can also include a network interface 320, a data store 330, memory 340, an Input/Output (I/O) interface 350, and the like, all of which are communicatively coupled together.

The network interface 320 can be used to enable the controller 210 to communicate on the DCN 260, such as to communicate control plane information to other controllers, to the management system 250, and the like. The network interface 320 can also include circuitry to tie various in-band communication channels at the node 110 together. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 210 to communicate with other devices. Further, the I/O interface 350 includes components for the controller 210 to communicate with the other nodes, such as using GCC overhead associated with OTN signals.

In an exemplary embodiment, the controller 210 is configured to perform the adaptive preconfiguration to preconfigure each line module 220 port in either a trail termination mode or a connection mode based on network dynamics. That is, each port is intelligently configured based on what type of ODU connection (ODUk or ODUj) is expected on the port. The configuration of the trail termination mode or the connection mode affects the clock and other hardware aspects of the line module 220.

Adaptive Preconfiguration

The adaptive preconfiguration is generalized and could be applied in various different manners depending on a topology of the network 100. The adaptive preconfiguration works for the typical line protection architecture such as APS M:N where N work lines are protected by M shared protection lines. The adaptive preconfiguration also works on mesh protection schemes with minimal adjustments.

In the adaptive preconfiguration, each line is assigned an attribute which can be referred to as an optimization attribute that indicates whether the line is protecting (or optimized to protect an ODUk connection (i.e., the line is in a connection mode) or an ODUj connection (i.e., the line is in a trail termination mode). The adaptive preconfiguration is configured to intelligently select the mode based on network dynamics. The optimization attribute can be set as:

| | |
|---|---|
| ODUk | Indicating that an ODUk connection will most likely get created on this line in case of a protection event or other dynamic service provisioning. This could be set by the operator or some external application like SDN, NMS, the control plane, etc. |
| ODUj | Indicating that an ODUj connection will most likely get created on this line in case of a protection event, or other dynamic service provisioning. This could be set by the operator or some external application like SDN, NMS, the control plane, etc. |
| AUTO | Indicates that the node will decide the correct mode for the line based on real-time evaluation of the services provisioned on the active work lines, and their respective priorities. |

Figure 4:
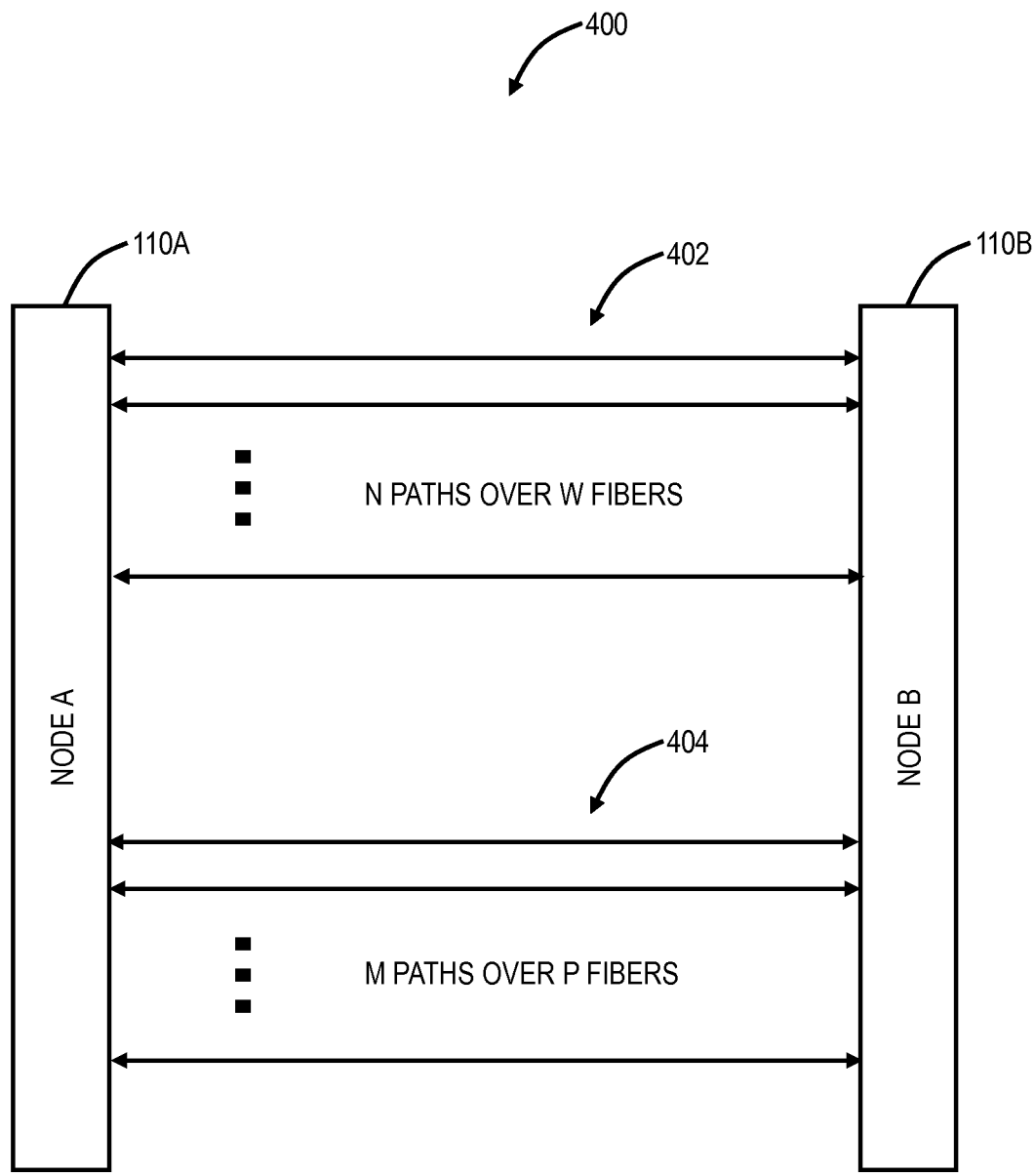
FIG. 4 is a network diagram of a network with two nodes to describe the adaptive preconfiguration for M:N APS.

Referring to FIG. 4, in an exemplary embodiment, a network diagram illustrates a network 400 with two nodes 110A, 110B. The network 400 is a typical APS line protection scheme where W fibers 402 are actively carrying N (N≥W≥1) client traffic signals between the nodes 110A, 110B. Each of the N client signals can be an ODUk path directly under an OTUk (k=0, 1, 2, 3, 4, flex, C2 . . . ), or ODUj (j<k) multiplexed under a HO ODUk. Furthermore, different client signals may have different priorities or SLAs. There are P fibers 404 between the two nodes 110A, 110B that are dedicated to protect the N working/active paths. Some or all of the active paths could also be manually put in "lockout of protection" state. The total bandwidth of the P fibers 404 is usually less than or equal to that of the W fibers 402 (N paths). Based on the type of traffic (ODUk or ODUj) and priorities of the active paths, the adaptive preconfiguration operating on or for each node 110 determine which of the active paths are to be protected at what resolved priority.

Figure 5:
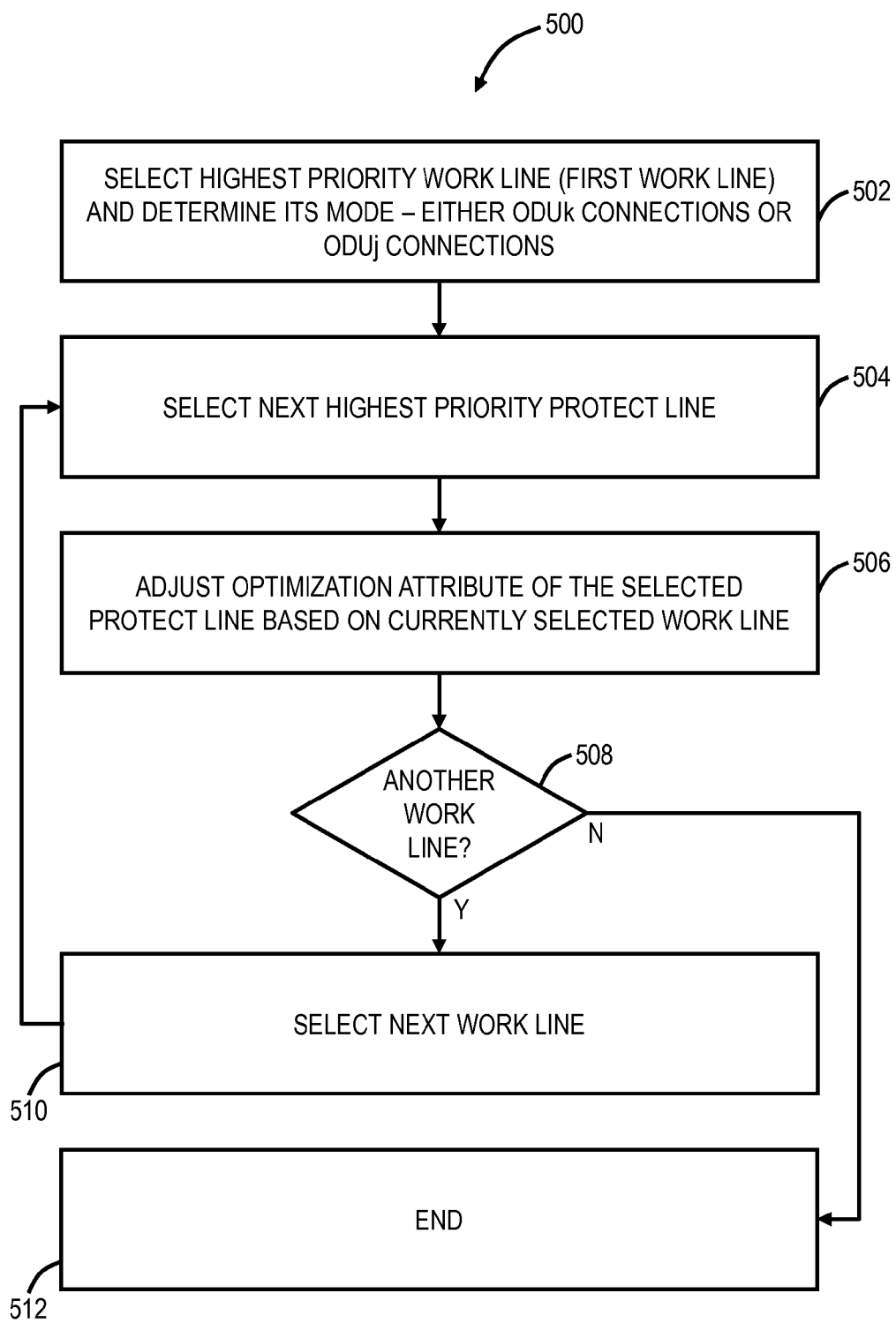
FIG. 5 is a flowchart of an adaptive preconfiguration process for APS line protection.

Referring to FIG. 5, in an exemplary embodiment, a flowchart illustrates an adaptive preconfiguration process 500 for APS line protection. The adaptive preconfiguration process 500 contemplates operation in the network 100 for APS protection and can be implemented by the node 110, the control plane 140, the SDN controller 150, the controller 210, etc. In terms of M:N protection, there are M work lines for N protect lines. The adaptive preconfiguration process 500 includes selecting a highest priority work line (first work line of the M work lines) and determining its mode—either ODUk connections or ODUj connections (step 502). Again, the mode is either a connection mode where the work line supports an ODUk or a trail termination mode where the work line supports one or more ODUj's. The next highest priority protect line is selected of the N protect lines (step 504). The optimization attribute is adjusted on the selected protect line based on the currently selected work line (step 506). Specifically, the selected protect line is configured in hardware based on the mode of the currently selected work line. The adaptive preconfiguration process 500 checks if there is a next highest priority work line (step 508), and if so, selects the next highest priority work line (step 510) and returns to step 504. If not (step 508), then the adaptive preconfiguration process 500 ends (step 512). In terms of the highest priority, the work lines can each be set with a given priority when provisioned, for example, high/medium/low, 1-10, or any other scale for differentiation. If there is not an ability to differentiate the work lines or the protect lines, other techniques can be used such as selecting lines based on provisioning time, connection identifiers, etc.

With the adaptive preconfiguration, a protection application itself could also be enhanced to take into consideration the optimization attribute of the protect lines when deciding which line to use in the event of a protection switch. Now, if a work line fails, the traffic will move to a protect line that is already preconfigured correctly, i.e., the appropriate mode, expediting the real-time provisioning and reducing the switch times.

The adaptive preconfiguration can be further refined by using more parameters to decide the correct mode. Other parameters that could be used are quality of the work line (e.g., based on pre-Forward Error Correction (FEC) errors seen that could indicate that the line is more likely to fail, Optical Signal-to-Noise Ratio (OSNR), Q factor, etc), number of times it has already switched, number of times a protect line has been configured in a certain mode, etc. The adaptive preconfiguration requires that both ends of the protect line are preconfigured in the same mode. This can be achieved when both the nodes 110A, 110B run the adaptive preconfiguration, but may also employ control plane signaling or other messaging to negotiate the mode configuration on each end of the line.

Adaptive Preconfiguration—Mesh Networks

The adaptive preconfiguration can also be implemented on a network with mesh protection, with modification to the adaptive preconfiguration process 500. Additionally, the optimization attribute can be expressed as a cost in path computation in routing, such as an administrative cost. This cost can be used to select a right link during mesh restoration, i.e., a link that is preconfigured to match the expected traffic.

Figure 6:
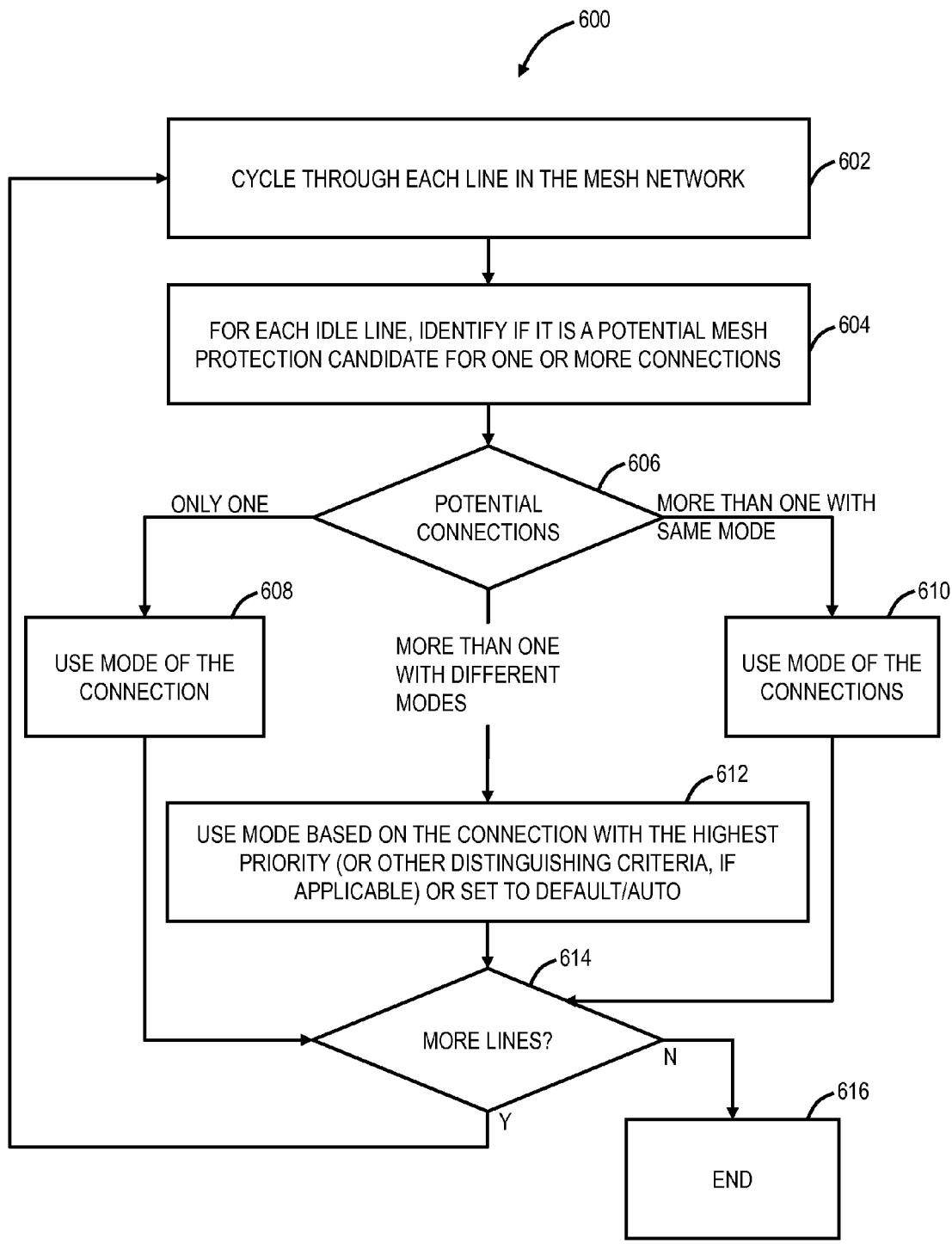
FIG. 6 is a flowchart of an adaptive preconfiguration process for mesh line protection.

Referring to FIG. 6, in an exemplary embodiment, a flowchart illustrates an adaptive preconfiguration process 600 for mesh line protection. The adaptive preconfiguration process 600 contemplates operation in the network 100 for mesh protection and can be implemented by the node 110, the control plane 140, the SDN controller 150, the controller 210, etc. The adaptive preconfiguration process 600 includes cycling through each line in the mesh network (step 602)

and, for each idle line, the adaptive preconfiguration process 600 can include identifying if it is a potential mesh protection candidate for one or more connections (step 604). These steps look at idle lines, i.e., lines physically configured, but not carrying active traffic, and determines what type of traffic may be rerouted to these lines. These steps are implemented by looking at the network topology and performing an analysis to see what rerouting may occur responsive to various faults. One exemplary embodiment could model a fault on each line individually and look to what would reroute to a particular idle line.

For each idle line, there can be one or more potential connections (step 606). If there is only one potential connection, the adaptive preconfiguration process 600 can include using the mode of that connection to configure the idle line, i.e., either a connection mode or a trail termination mode (step 608). If there are more than one potential connections but each has the same mode, the adaptive preconfiguration process 600 can include using the mode of the potential connections to configure the idle line, i.e., either a connection mode or a trail termination mode (step 610). If there are more than one potential connections and each has a different mode, the adaptive preconfiguration process 600 can include using a mode based on the connection with the highest priority (or other distinguishing criteria, if applicable) or setting to a default/auto mode (step 612). Here, there are multiple potential connections which are different modes, and the adaptive preconfiguration process 600 can select the highest priority for determining the mode, in an exemplary embodiment. Alternatively, the adaptive preconfiguration process 600 can select the mode most used by the multiple potential connections, in another exemplary embodiment. For example, if there are ten potential connections and 9 are one mode, the adaptive preconfiguration process 600 can select that mode. In a further exemplary embodiment, the adaptive preconfiguration process 600 can select the mode based on some distinguishing criteria, e.g., connection ID, connection creation time, etc. Other embodiments are also contemplated.

If there are more lines (step 614), the adaptive preconfiguration process 600 continues (step 602). Otherwise, the adaptive preconfiguration process 600 ends (step 616). Note, the adaptive preconfiguration process 600 looks at current network dynamics, i.e., currently provisioned lines against idle lines, to intelligently determine how each of the idle lines should be provisioned—either a connection mode or a trail termination mode.

Figure 7:
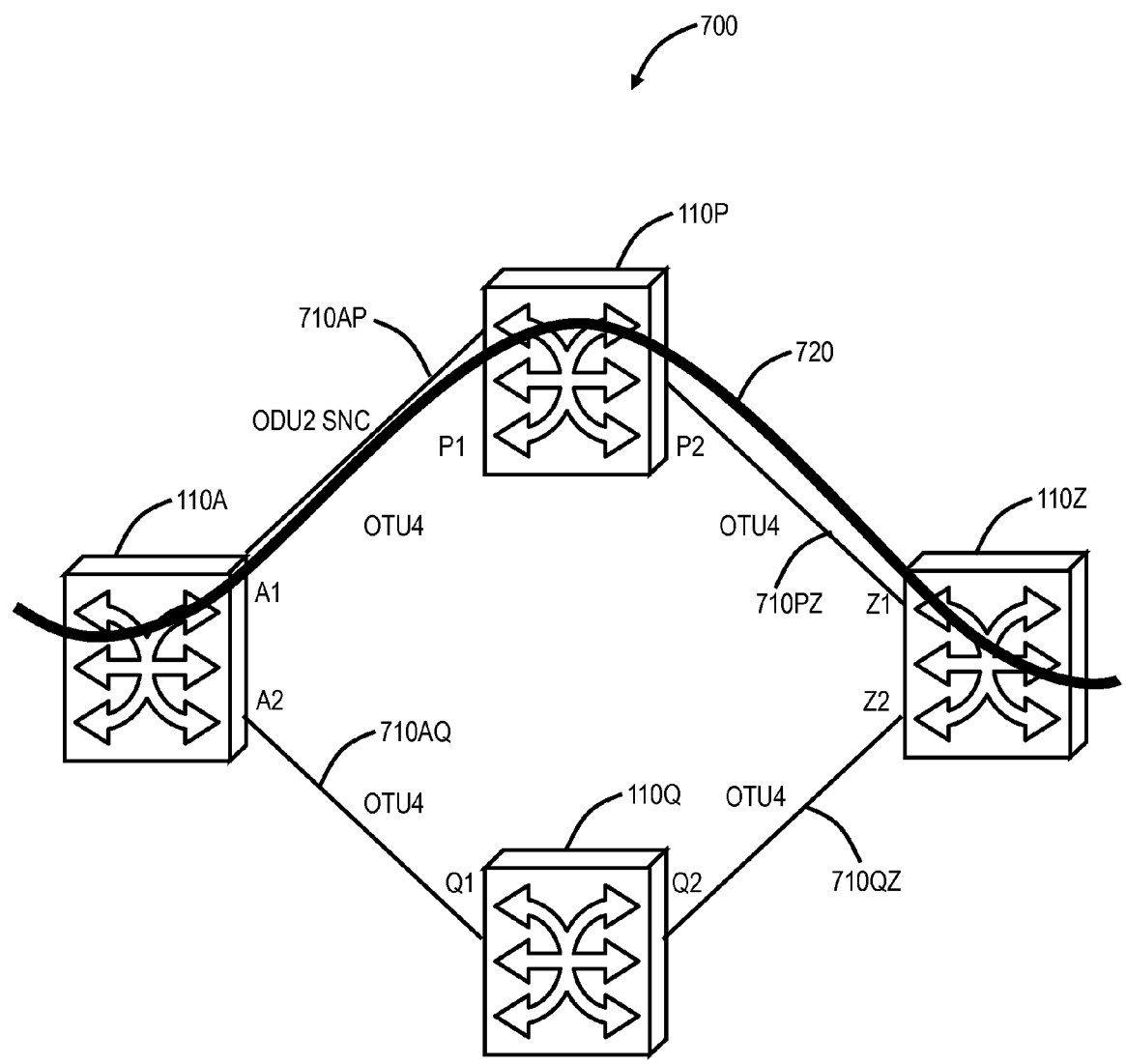
FIG. 7 is a network diagram of a mesh network for an exemplary operation of the adaptive preconfiguration process of FIG. 6 related to a single potential mesh connection.

Referring to FIG. 7, in an exemplary embodiment, a network diagram illustrates a mesh network 700 for an exemplary operation of the adaptive preconfiguration process 600, related to a single potential mesh connection. The mesh network 700 includes nodes 110A, 110P, 110Q, 110Z with physical links 710AP, 710AQ, 710PZ, 710QZ each supporting an OTU4 connection. The physical link 710AP connects port A1 on the node 110A to port P1 on the node 110P, the physical link 710PZ connects port P2 on the node 110 P to port Z1 on the node 110Z, the physical link 710QZ connects port Z2 on the node 110Z to port Q2 on the node 110Q, and the physical link 710AQ connections port Q1 on the node 110Q to port A2 on the node 110A. In an exemplary embodiment, the network 700 includes a connection 720 between port A1 and port Z1 through the node 110P. The connection 720 can be an ODU2 SNC; thus, the links 710AP, 710PZ are configured in a trail termination mode, i.e., an OTU4 carrying an ODU2. The adaptive preconfiguration process 600 recognizes that the links 710AQ, 710QZ will be used in case the ODU2 SNC connection 720 meshes, and that the connection 720 is carrying ODUj traffic (i.e., in a trail termination mode). Thus, the adaptive preconfiguration process 600 removes a default pass-through or connection mode on the ports A2, Q1, Q2 and Z2 and set them to default trail termination mode. Now, the lines between the ports A2-Q1 and Q2-Z2 are pre-provisioned and when the SNC connection 720 meshes to them, it will not have to create ODU4 TTP(s) in real-time (since they are already provisioned). The other steps will be done as usual.

Figure 8:
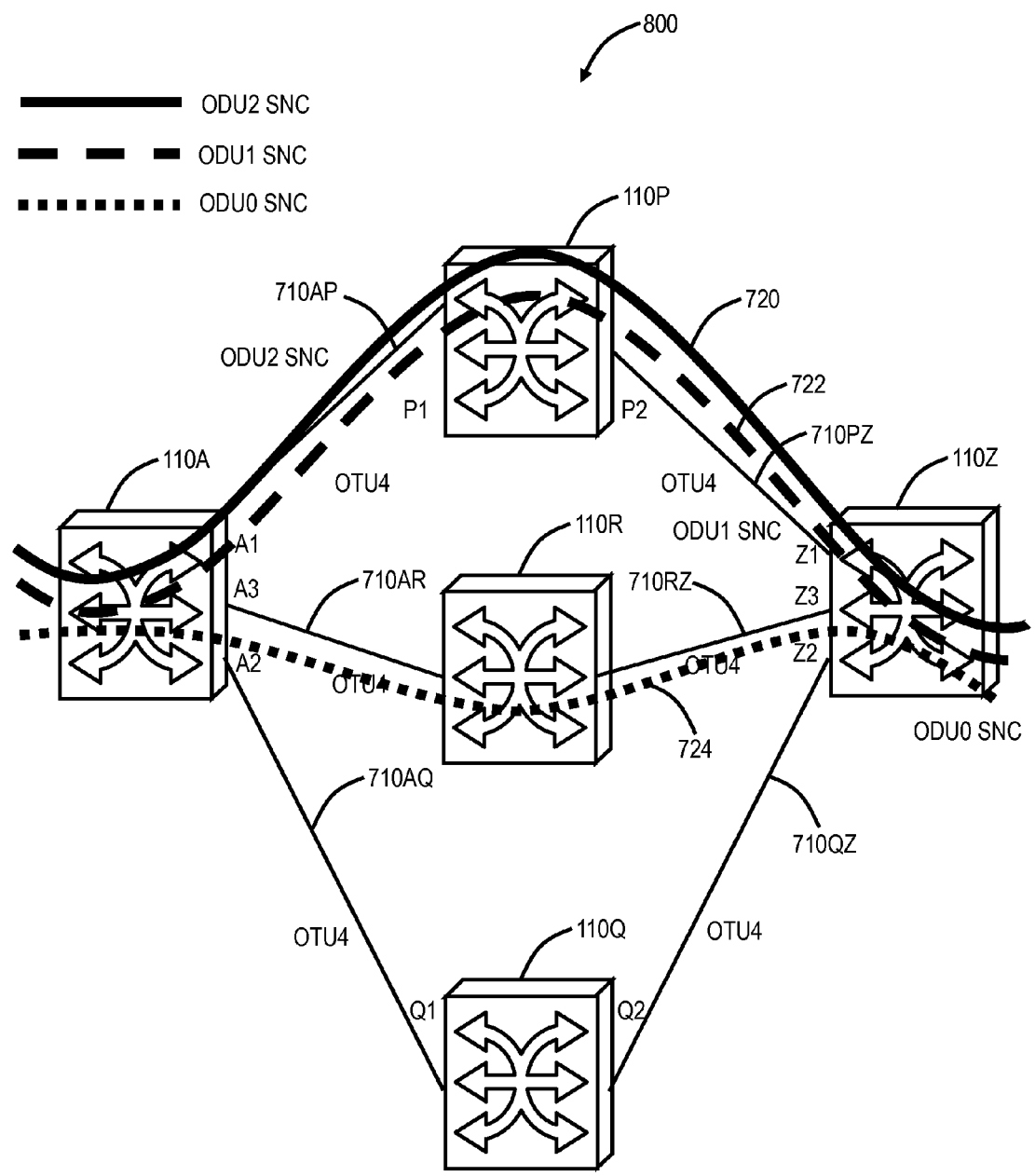
FIG. 8 is a network diagram of a mesh network for another exemplary operation of the adaptive preconfiguration process of FIG. 6 related to multiple potential mesh connections in a same mode (ODUj)

Referring to FIG. 8, in an exemplary embodiment, a network diagram illustrates a mesh network 800 for another exemplary operation of the adaptive preconfiguration process 600, related to multiple potential mesh connections in a same mode (ODUj). The mesh network 800 includes all of the nodes 110A, 110P, 110Q, 110Z with physical links 710AP, 710AQ, 710PZ, 710QZ each supporting an OTU4 connection as in the mesh network 700 along with an additional node 110R and links 710AR, 710RZ each supporting an OTU4 connection. The mesh network 800 includes the connection 720 along with connections 722, 724. The connection 720 can be an ODU2 SNC, the connection 722 can be an ODU1 SNC, and the connection 724 can be an ODU0 SNC. Thus, the links 710AP, 710PZ have multiple connections, but each in an ODUj mode (trail termination mode), and the links 710AR, 710RZ have one connection, in an ODUj mode (trail termination mode). Thus, FIG. 8 is a multiple ODUj example. The adaptive preconfiguration process 600 recognizes that lines A2-Q1 and Q2-Z2 might be used if one or more ODUj SNCs mesh. This is because the links 710AP, 710PZ and 710AR, 710RZ each carry ODUj's. The adaptive preconfiguration process 600 removes a default pass-through or connection mode on the ports A2, Q1, Q2 and Z2 and set them to default trail termination mode. Now, the lines between the ports A2-Q1 and Q2-Z2 are pre-provisioned and when the SNC connection 720 meshes to them, it will not have to create ODU4 TTP(s) in real-time (since they are already provisioned). The other steps will be done as usual.

Figure 9:
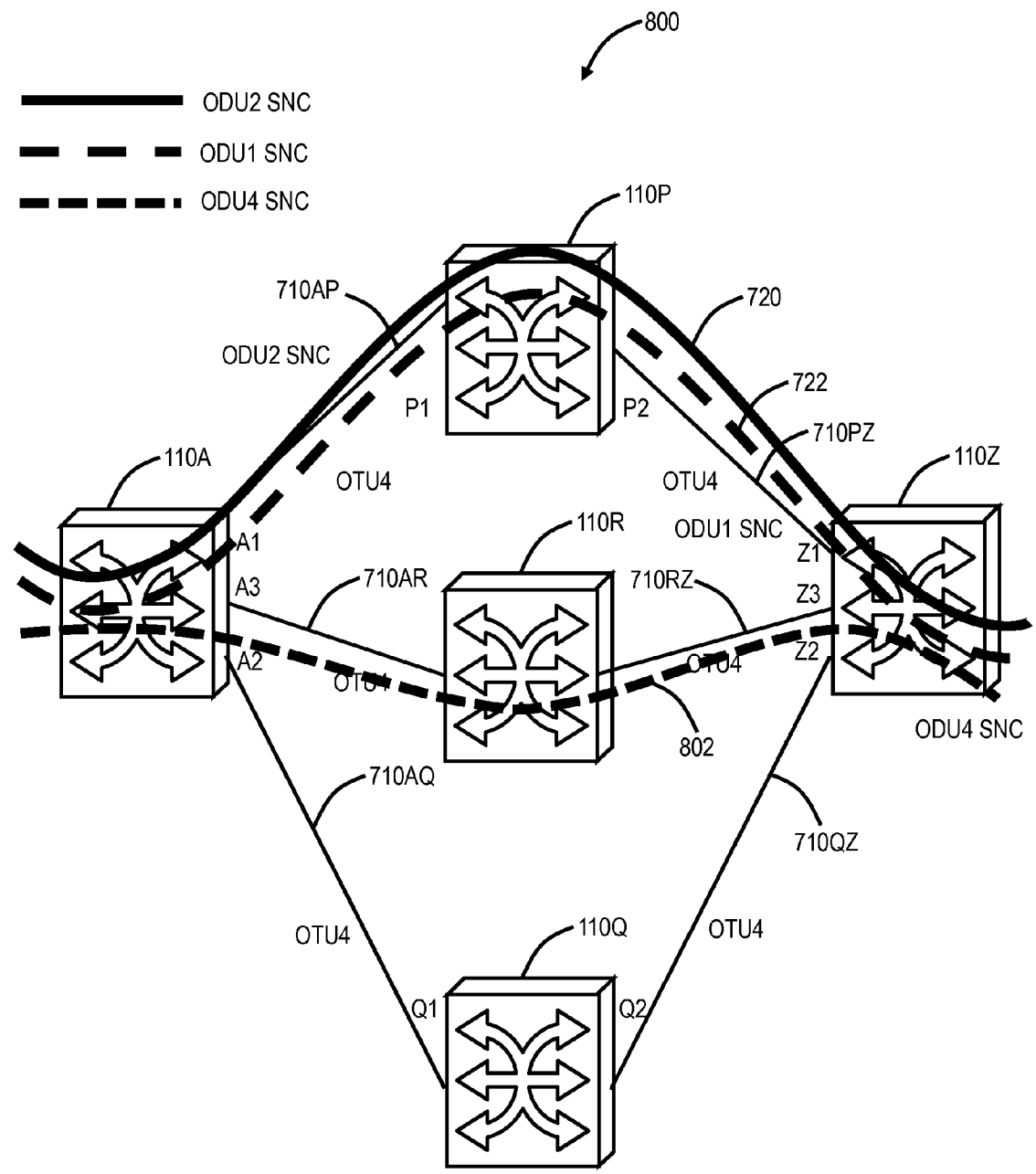
FIG. 9 is a network diagram of the mesh network of FIG. 8 for another exemplary operation of the adaptive preconfiguration process of FIG. 6 related to multiple potential mesh connections in different modes.

Referring to FIG. 9, in an exemplary embodiment, a network diagram illustrates the mesh network 800 for another exemplary operation of the adaptive preconfiguration process 600, related to multiple potential mesh connections in different modes. In the example of FIG. 9, the network 800 includes the connections 720, 722. The connection 720 can be an ODU2 SNC, and the connection 722 can be an ODU1 SNC. The network 800 also includes a connection 802 which can be an ODU4 SNC. Thus, the links 710AP, 710PZ have multiple connections, but each in an ODUj mode (trail termination mode), and the links 710AR, 710RZ have one connection, in a different mode, i.e., an ODUk mode (connection mode). The adaptive preconfiguration process 600 recognizes that the lines A2-Q1 and Q2-Z2 might be used in case one of the ODUj SNCs meshes (the connections 720, 722), but also recognize that line A2-Q1 and Q2-Z2 might be used in case the ODUk SNC meshes (the connection 802). The adaptive preconfiguration process 600 can determine which of these connections 720, 722, 802 has the highest priority and set the mode of the lines between the ports A2-Q1 and Q2-Z2 accordingly.

In this example, assume the priorities are either the same or not applicable, so default to ODUj optimization, based on a globally configured default mode. The adaptive preconfiguration process 600 removes a default pass-through or connection mode on the ports A2, Q1, Q2 and Z2 and set them to default trail termination mode. Now, the lines between the ports A2-Q1 and Q2-Z2 are pre-provisioned and when the SNC connection 720 meshes to them, it will not have to create ODU4 TTP(s) in real-time (since they are already provisioned). However if the ODU4 SNC (the connection 802) meshes the lines 710AQ, 710QZ, then the ports A2, Q1, Q2, Z2 are not pre-provisioned for that mode and there will not be any benefit achieved. However, these ports can be reconfigured. This demonstrates that the pre-provisioning will not help in all possible cases, but it will at least serve the most likely cases or the highest priority client signals.

Figure 10:
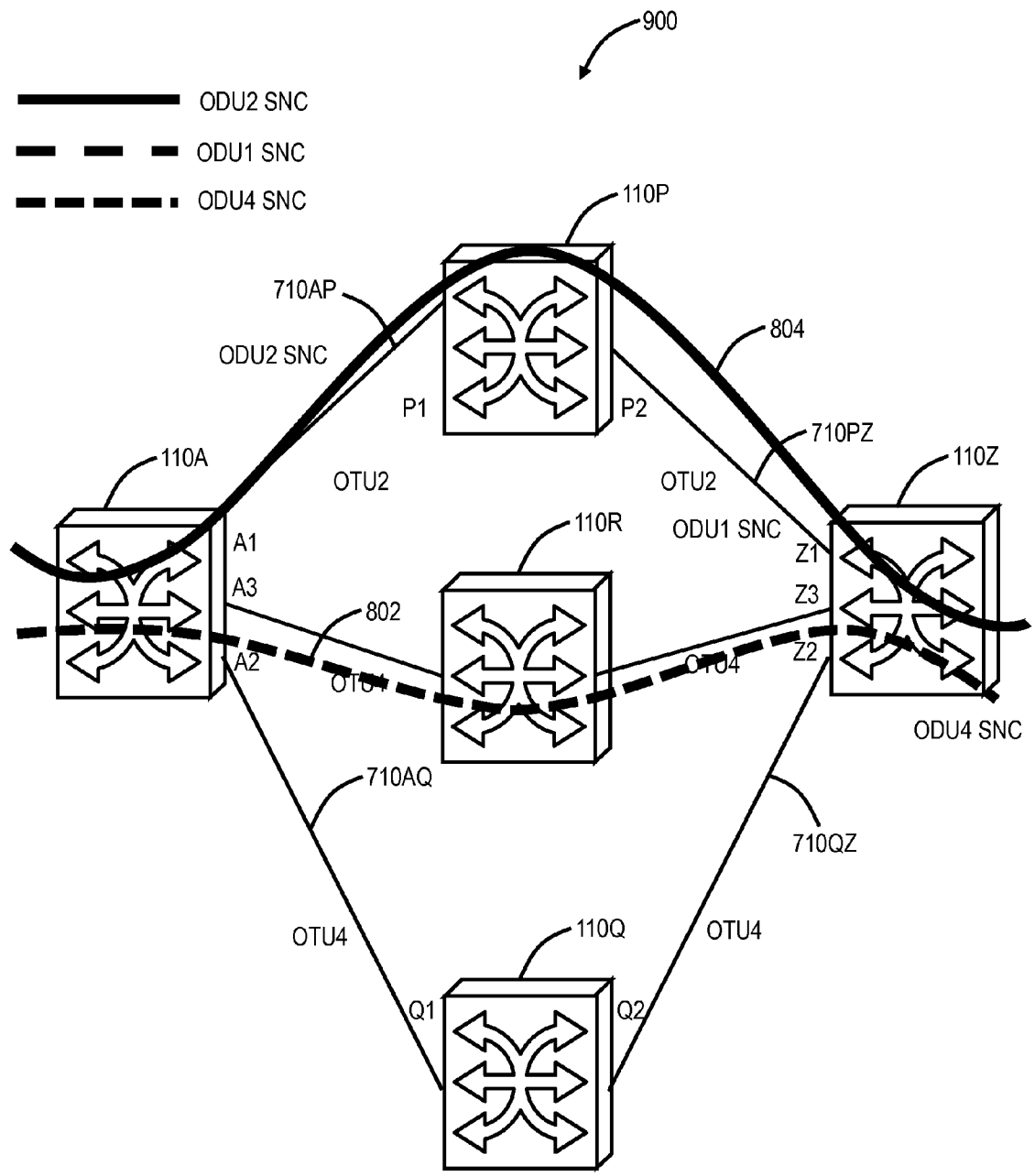
FIG. 10 is a network diagram of a mesh network for another exemplary operation of the adaptive preconfiguration process of FIG. 6 related to multiple potential mesh connections in similar modes, but different "k" levels.

Referring to FIG. 10, in an exemplary embodiment, a network diagram illustrates a mesh network 900 for another exemplary operation of the adaptive preconfiguration process 600, related to multiple potential mesh connections in similar modes, but different "k" levels. The mesh network 900 has a same topology of the mesh network 800, however, the physical links 710AP, 710PZ are OTU2, instead of OTU4, while all the remaining physical links are OTU4. Here, this example shows how the adaptive preconfiguration process 600 work for a mix of ODUk SNCs at different "k" levels. In this case, there is a connection 804 which is an ODU2 SNC going through the node 110P while there is the connection 802 which is an ODU4 SNC going through the node 110R. Both are at "k" level with respect to their respective current paths but in case of mesh one of them could become a "j" signal on the protect path. In this case, the adaptive preconfiguration process 600 will go by the priority of the SNC.

The adaptive preconfiguration process 600 recognizes that lines A2-Q1 and Q2-Z2 might be used in case one of the ODUk SNCs meshes, but also recognize that one of these SNCs will actually become a "j" SNC on the protect line (ODU2 SNC in this example). That is, the OTU2 on the links 710AP, 710PZ carries the ODU2 connection 804 while in a connection mode (ODUk), but when the ODU2 SNC mesh restores to the links 710AQ, 710QZ, the ODU2 connection 804 is carried over OTU4 in a trail termination mode (ODUj).

The adaptive preconfiguration process 600 determines which of these connections 802, 804 has the highest priority. In this case, say, assume the priority of the ODU2 SNC (the connection 804) is the highest, so the links 710AQ, 710QZ are set to ODUj optimization on the protect line. The adaptive preconfiguration process 600 removes the default pass through mode or connection mode on ports A2, Q1, Q2 and Z2 and set them to a trail termination mode. Now the lines A2-Q1 and Q2-Z2 are pre-provisioned, and when any ODU2 SNC meshes to it, it will not have to create ODU4 TTP in real time (since it is already there). However, if the ODU4 SNC meshes to the node 110Q, then the ports are not pre-provisioned for that mode, and there will not be any benefit achieved. This demonstrates that the pre-provisioning will not help in all possible cases, but it will at least serve the most likely cases or the highest priority client signals.

Figure 11:
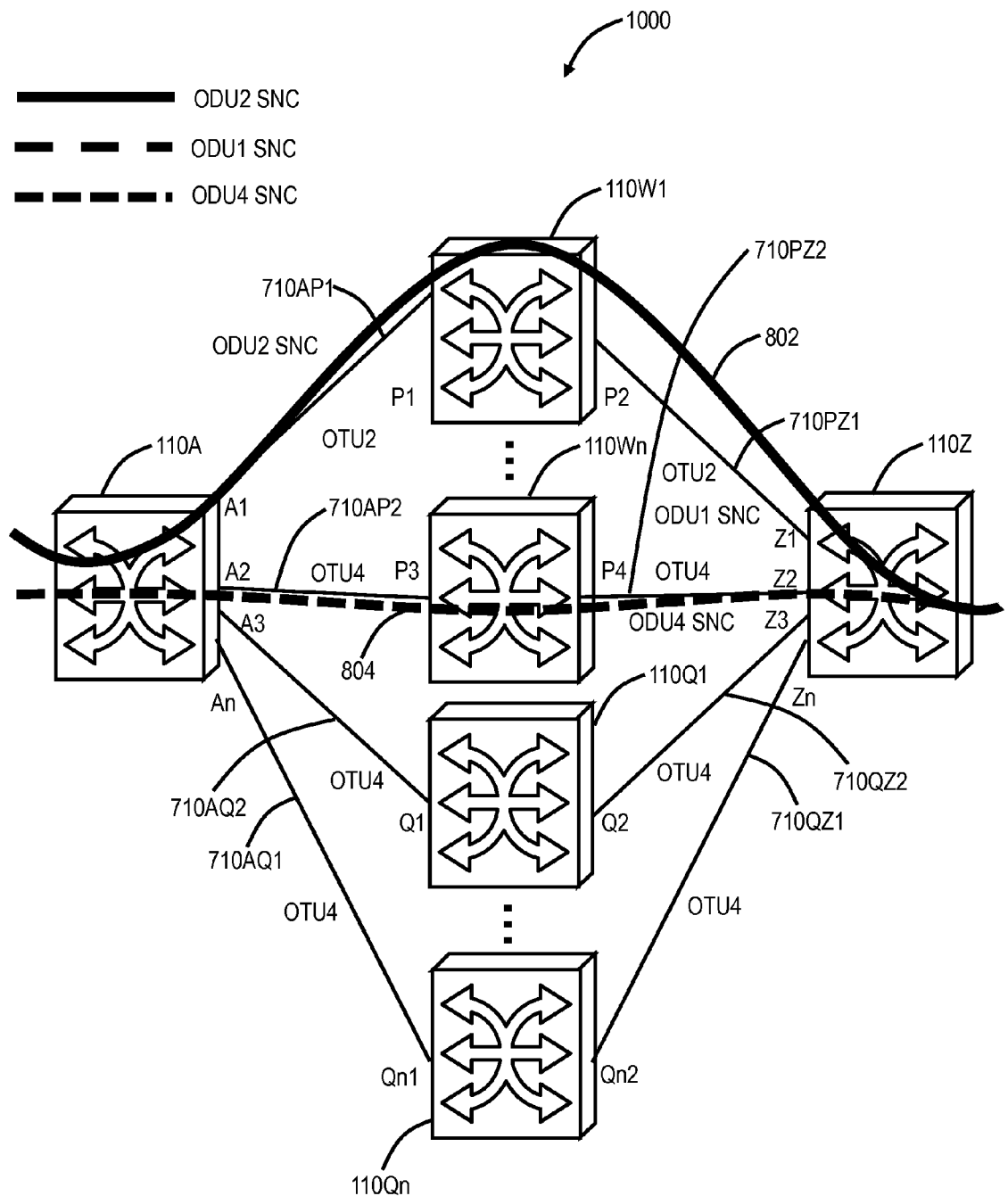
FIG. 11 is a network diagram of a mesh network for another exemplary operation of the adaptive preconfiguration process of FIG. 6 related to multiple protect lines.

Referring to FIG. 11, in an exemplary embodiment, a network diagram illustrates a mesh network 1000 for another exemplary operation of the adaptive preconfiguration process 600, related to multiple protect lines. The mesh network 1000 includes the nodes 110A, 110Z along with multiple intermediate nodes 110W1, 110Wn, 110Q1, 110Qn. The network 1000 include links 710AP1, 710AP2, 710AQ1, 710AQ2, 710PZ1, 710PZ2, 710QZ1, 710QZ2. All of the links are OTU4 except the links 710AP1, 710PZ1 which are OTU2. For this example, there are the connections 802, 804 with the connection 802 as an ODU2 SNC and the connection 804 as an ODU4 SNC. In this example, there are multiple lines available to provide protection for any mesh restore. The adaptive preconfiguration process 600 recognizes that lines A3-Q1, An-Qn1, Q2-Z3, Qn2-Zn, etc. might be used in case one or more SNCs mesh and also that one or more SNCs will actually become a "j" SNC on protect line (i.e., the connection 802).

The adaptive preconfiguration process 600 determines which of these SNCs has the highest priority. In this case, assume the priority of the ODU2 SNC is the highest, the protect line on ports A3, Q1, Q2 and Z3 can be set to ODUj optimization. The adaptive preconfiguration process 600 can remove the default pass through mode on ports A3, Q1, Q2 and Z3 and set them to a trail termination mode. Now the links 710AQ2, 710QZ2 are pre-provisioned and when any ODU2 (or any ODUj) SNC meshes to it, it will not have to create ODU4 TTP in real time (since it is already there). The adaptive preconfiguration process 600 cam repeat for the next highest priority work line. In this example, the second protect line would be set to support the ODU4 SNC. So the ports An, Qn1, Qn2, A3 and Zn would go in the default pass-through mode (connection mode). The adaptive preconfiguration process 600 can continue to repeat this process.

Mode Synchronization Across Nodes

The optimization attribute could also be reconciled with neighboring nodes 110 if required. The negotiation between the two nodes 110 for the final optimum protection path can be achieved by control plane messaging such as APS, GMPLS, ASON, OSRP, etc., depending on the availability of the protocols. Furthermore, the control plane messages are enhanced to not only advertise the bandwidth and supported service types but also the information about how the protection bandwidth is optimized. One node 110 can be the master node and its decision on the final protection path prevails. In cases that the negotiation fails, nodes 110 can preconfigure the path in a system default mode.

Mode Optimization in Cloud

The optimization attribute could also be done in the cloud with a global view of the network, e.g., SDN, NMS, etc. In such cases, the adaptive preconfiguration processes 500, 600 can be implemented in the SDN controller or in the NMS software rather than in the NE software. In such a case, an NE algorithm can be disabled and will follow the SDN/NMS instructions to optimize the protect line.

Adaptive Preconfiguration Process

Figure 12:
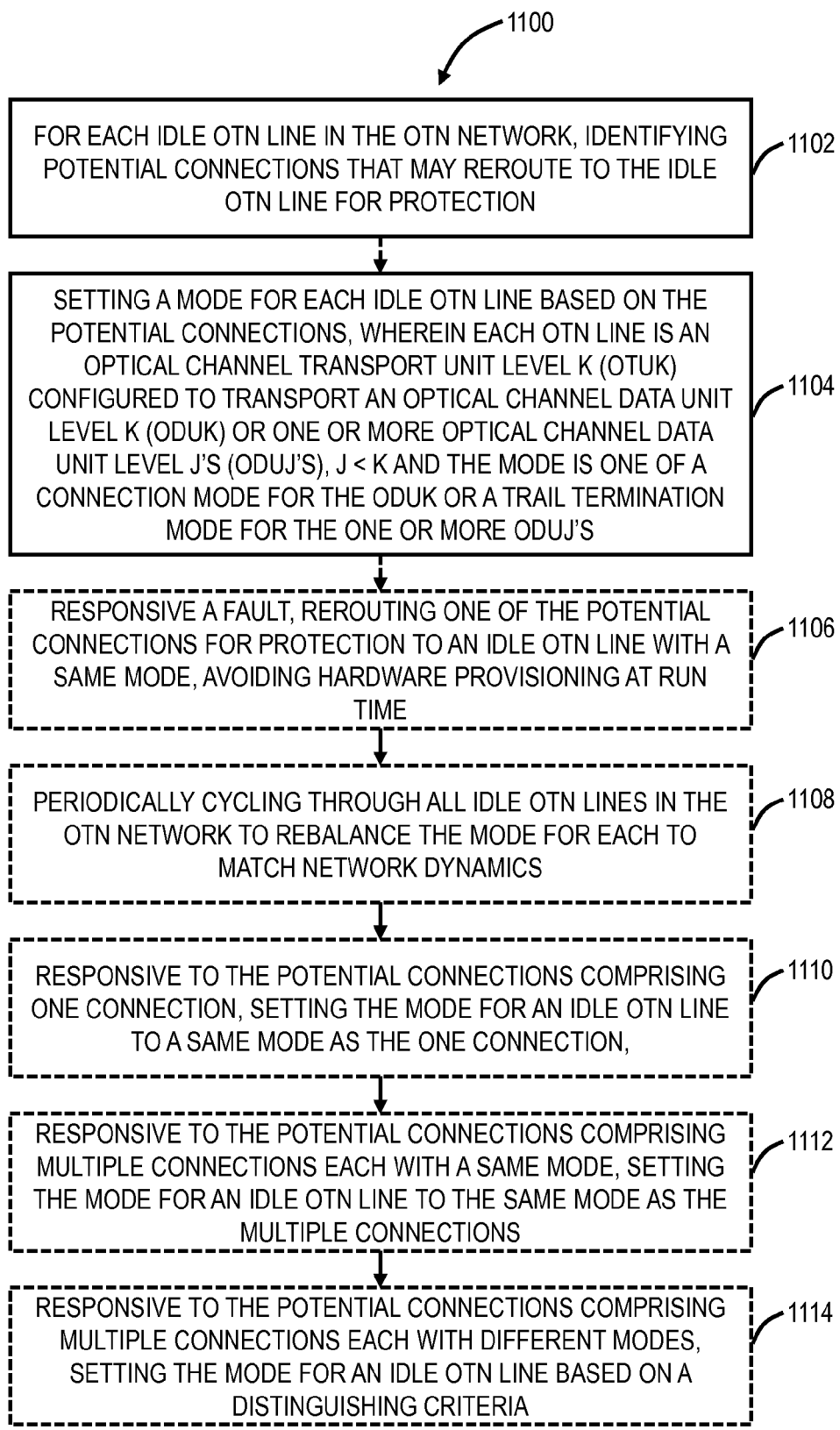
FIG. 12 is a flowchart of a process for adaptively preconfiguring Optical Transport Network (OTN) connections in an OTN network.

Referring to FIG. 12, in an exemplary embodiment, a flowchart illustrates a process 1100 for adaptively preconfiguring Optical Transport Network (OTN) connections in an OTN network. The process 1100 includes, for each idle OTN line in the OTN network, identifying potential connections that may reroute to the idle OTN line for protection (step 1102); and setting a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's (step 1104). The process 1100 can further include, responsive a fault, rerouting one of the potential connections for protection to an idle OTN line with a same mode, avoiding hardware provisioning at run time (step 1106). The process 1100 can further include periodically cycling through all idle OTN lines in the OTN network to rebalance the mode for each to match network dynamics (step 1108). The process 1100 can further include, responsive to the potential connections comprising one connection, setting the mode for an idle OTN line to a same mode as the one connection (step 1110), responsive to the potential connections comprising multiple connections each with a same mode, setting the mode for an idle OTN line to the same mode as the multiple connections (step 1112), and, responsive to the potential connections comprising multiple connections each with different modes, setting the mode for an idle OTN line based on a distinguishing criteria (step 1114). The distinguishing criteria can be based on a priority of the potential connections.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element operating in an Optical Transport Network (OTN) network and configured to adaptively preconfigure OTN connections, the network element comprising:
   one or more ports, each port supporting an OTN line; and
   a controller communicatively coupled to the one or more ports and adapted to
      for each idle OTN line in the OTN network, identify potential connections that may reroute to the idle OTN line for protection, and
      set a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's.

2. The network element of claim 1, wherein the connection mode is configured to support High Order Optical channel Data Unit level k (ODUk) connections and the trail termination mode is configured to support Low Order Optical channel Data Unit level j (ODUj) connections.

3. The network element of claim 1, wherein the controller is configured to reroute for protection one of the existing OTN connections to a port of the one or more ports with a same mode, avoiding hardware provisioning at run time.

4. The network element of claim 1, wherein the controller is configured to automatically preconfigure the port based on an evaluation of which of the existing OTN connections restore to the port.

5. The network element of claim 1, wherein the controller is configured to distribute modes of the one or more ports, each with an idle connection, to match the existing OTN connections from a protection perspective.

6. The network element of claim 1, wherein the controller preconfigures the port based on communication from one of a Software Defined Networking (SDN) controller, a Network Management System (NMS), and an Element Management System (EMS).

7. The network element of claim 1, wherein the controller is configured to signal to another network element to coordinate a mode of the port via a control plane.

8. The network element of claim 1, wherein the controller automatically preconfigures the port based on a determination of potential connections of the existing OTN connections that may reroute to the port for protection.

9. The network element of claim 8, wherein:
   responsive to the potential connections comprising one connection, the mode is set for the port to a same mode as the one connection,
   responsive to the potential connections comprising multiple connections each with a same mode, the mode is set for the port to the same mode as the multiple connections, and
   responsive to the potential connections comprising multiple connections each with different modes, the mode is set for the port based on a distinguishing criteria.

10. A controller communicatively coupled to one or more nodes in an Optical Transport Network (OTN) network and configured to adaptively preconfigure OTN connections in the OTN network, the controller comprising:
   a processor; and
   memory storing instructions that, when executed, cause the processor to
      for each idle OTN line in the OTN network, identify potential connections that may reroute to the idle OTN line for protection, and
      set a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's.

11. The controller of claim 10, wherein the potential connections are rerouted for protection to an idle OTN line with a same mode, avoiding hardware provisioning at run time.

12. The controller of claim 10, wherein the controller is configured to distribute modes to match the existing OTN connections in the OTN network from a protection perspective.

13. The controller of claim 10, wherein the memory storing instructions that, when executed, further cause the processor to
responsive to the potential connections comprising one connection, set the mode for an idle OTN line to a same mode as the one connection,
responsive to the potential connections comprising multiple connections each with a same mode, set the mode for an idle OTN line to the same mode as the multiple connections, and
responsive to the potential connections comprising multiple connections each with different modes, set the mode for an idle OTN line based on a distinguishing criteria.

14. The controller of claim 10, wherein the controller is configured to signal to coordinate a mode of the port via a control plane.

15. A method for adaptively preconfiguring Optical Transport Network (OTN) connections in an OTN network, the method comprising:
for each idle OTN line in the OTN network, identifying potential connections that may reroute to the idle OTN line for protection; and
setting a mode for each idle OTN line based on the potential connections, wherein each OTN line is an Optical channel Transport Unit level k (OTUk) configured to transport an Optical channel Data Unit level k (ODUk) or one or more Optical channel Data Unit level j's (ODUj's), j<k and the mode is one of a connection mode for the ODUk or a trail termination mode for the one or more ODUj's.

16. The method of claim 15, further comprising:
responsive a fault, rerouting one of the potential connections for protection to an idle OTN line with a same mode, avoiding hardware provisioning at run time.

17. The method of claim 15, further comprising:
periodically cycling through all idle OTN lines in the OTN network to rebalance the mode for each to match network dynamics.

18. The method of claim 15, further comprising:
responsive to the potential connections comprising one connection, setting the mode for an idle OTN line to a same mode as the one connection,
responsive to the potential connections comprising multiple connections each with a same mode, setting the mode for an idle OTN line to the same mode as the multiple connections, and
responsive to the potential connections comprising multiple connections each with different modes, setting the mode for an idle OTN line based on a distinguishing criteria.

19. The method of claim 18, wherein the distinguishing criteria is based on a priority of the potential connections.

* * * * *